United States Patent Office 2,974,139
Patented Mar. 7, 1961

2,974,139

THIOPHENYLPYRIDYL AMINES

Wilhelm A. Schuler, Bad Homburg, and Hans Klebe, Gelnhausen, Germany, assignors to Deutsche Gold- und Silber-Scheideanstalt vormals Roessler, Frankfurt am Main, Germany No Drawing. Filed Sept. 30, 1955, Ser. No. 537,896

Claims priority, application Germany Oct. 2, 1954

6 Claims. (Cl. 260—243)

The present invention relates to a new class of compounds, namely thiophenylpyridyl amines of the general formula

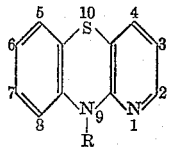

their salts and their quaternary ammonium compounds. The benzene and pyridine nuclei of such compounds can also carry one or more substituents, such as, for example, hydroxy groups, halogen, alkyl groups, such as, the methyl group, as well as alkoxy groups and the like. R signifies hydrogen or an aliphatic or aromatic radical, such as, for example, alkyl, aryl, aralkyl acyl, cycloalkyl or amino alkyl radicals.

According to the invention it was found that these compounds can be prepared by introducing a sulfur atom into a phenylpyridyl amine of the general formula

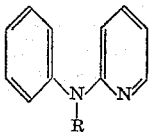

with the splitting off of two hydrogen atoms.

It was found that this introduction of the sulfur atom expediently could be effected by reacting phenylpyridyl amine with sulfur at elevated temperatures. Preferably, such reaction is carried out in the presence of catalysts such as iodine, aluminum chloride, boron fluoride and the like. The reaction advantageously can be carried out in the presence of a solvent.

Instead of elemental sulfur, sulfur compounds can also be employed which can form the sulfur bridge between pyridine and phenyl radicals under the reaction conditions employed. Examples of of such sulfur compounds are sulfur monochloride (SCl, $S_2Cl_2$), sulfur dichloride ($SCl_2$), sodium thiosulfate, antimony sulfide, arsenic sulfide, alkali metal polysulfides, thionyl chloride and similar compounds. The phenylpyridyl amines also can be used in the form of their salts, for example, when sodium thiosulfate is employed as the sulfur donor.

The best results are obtained when secondary phenylpyridyl amines (i.e., R=H) are employed as starting materials. It is, however, possible to produce tertiary thiophenylpyridyl amines by the process described. Those tertiary compounds in which R is an amino alkyl radical are of special significance and in the production of such tertiary compounds it is advisable to carry out the reaction under milder conditions, for example, employing $SCl_2$ as the sulfur donor or using the amine in the form of its salt.

Preferably, howeved, the tertiary thiophenylpyridyl amines are produced by first preparing the secondary thiophenylpyridyl amines (R=H) in the manner described above and then replacing the hydrogen atom of the secondary amino group to produce the desired tertiary amine.

The tertiary thiophenylpyridyl amines, for example, can be prepared by reacting secondary thiophenylpyridyl amine with a halide of the formula R′—Hal R′—CO—Hal or

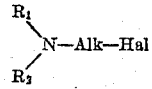

in which R′ are alkyl, aryl or aralkyl radicals, Alk is a straight or branched chained alkylene group and $R_1$ and $R_2$ are alkyl groups, which can be joined to form a ring, which ring can also be intercepted by hetero atoms as, for example, is the case in a morpholinoethyl radical. $R_1$ or $R_2$ can also join with the alkylene chain to form a ring.

This reaction expediently is carried out at elevated temperatures and, if necessary, in the presence of an alkaline condensing agent, such as, soda amide, sodium hydroxide soda and the like.

Those tertiary thiophenylpyridyl amines wherein R is an amino alkyl group of the general formula

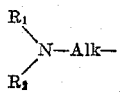

are of special interest for therapeutics. In such formula, Alk, $R_1$ and $R_2$ have the same meaning as above.

The thiophenylpyridyl amines according to the invention can be converted into their salts, such as, for example, their hydrogen chloride salts, in a manner known per se. The tertiary thiophenylpyridyl amines according to the invention can also be converted to the corresponding quaternary or bi-quaternary compounds by treatment with esters, such as, for example, alkyl halides or alkyl sulfates.

The new compounds according to the invention are valuable intermediates for the production of pharmaceuticals and can also be directly used as medicaments, for example, as vermicides, sedatives, narcotics, anti-allergy compounds and sympathomimetic compounds.

The following examples will serve to illustrate several modifications according to the invention:

Example 1

85 parts of phenylpyridyl amine, 21 parts of powdered sulfur and 1.7 parts of iodine were heated to 275° C. for two hours. Evolution of hydrogen sulfide began when the mixture reached a temperature of 250° C. and became vigorous when it reached 275° C. Such evolution of hydrogen sulfide diminished after about 1 hour at 275° C. A light oil was distilled from the reaction mixture under vacuum (pressure=2–3 mm. Hg.). This oil which contained phenylpyridyl amine in addition to the thiophenylpyridyl amine was then treated at boiling temperature with approximately the theoretical amount of 2–3 normal HCl until complete solution resulted with formation of the HCl salts of the amines. The solution was then treated with 1 to 2% (based upon the substance mixture) of active carbon and then filtered hot. The filtrate was then cooled to 0° C. whereupon the thiophenylpyridyl amine hydrochloride crystallized out while the phenylpyridyl amine hydrochloride remained in solution. The thiophyenylpyridyl amine hydrochloride was filtered off and suspended in water and the pH adjusted with half concentrated ammonia to 8. The thiophenylpyridyl amine set free was filtered off and dried. It was in the form of gold yellow needles and had a melting point of 114–115° C. The phenylpyridyl amine was recovered from the hydrochloride solution by treatment with concentrated ammonia.

It was found that not more than the theoretical quantity of sulfur should be employed for the reaction and that the best yields of thiophenylpyridyl amine were obtained when only about ⅔ of the theoretical amount of sulfur was employed. It was also found that the reaction period should not be extended too long. For example, when the reaction mixture was heated for six hours at 255–260° C. instead of two hours at 275° C., the yield of thiophenylpyridyl amine was noticeably decreased and the distillation residue increased.

The efficiency of the hydrochloric acid method of separating the thiophenylpyridyl amine from the phenylpyridyl amine is illustrated by the fact that when a mixture of 20 grams of thiophenylpyridyl amine and 20 grams of phenylpyridyl amine were separated thereby in the manner described above, 19.5 grams (97.5%) of the thiophenylpyridyl amine were isolated and 18.5 grams (93%) of the phenylpyridyl amine were isolated. While the sulfuric acid salts of both amines have solubilities in water similar to the hydrochloride salts, the sulfuric acid salt of thiophenylpyridyl amine separates out only as an oily liquid which is crystallized only with difficulty. Consequently, therefore, while sulfuric acid and other strong mineral acids can be employed to effect the separation, hydrochloric acid is preferred.

*Example 2*

85 parts of phenylpyridyl amine, 32 parts of sulfur and 15 parts of aluminum chloride were heated for three hours at 270° C. The reaction product was then directly distilled under vacuum. The resulting light oil which distilled over was then dissolved in ethanol and after admixing the solution with active carbon it was filtered and the thiophenylpyridyl amine was crystallized out of the filtrate as gold yellow needles with a M.P. of 114–115° C.

*Example 3*

52 parts of phenylpyridyl amine hydrochloride were heated with 80 parts of anhydrous sodium thiosulfate. Hydrogen sulfide evolution began at 280° C. and this temperature was maintained for 7–8 hours. The resultant product was the vacuum distilled and treated as in Example 2 to recover the thiophenylpyridyl amine.

*Example 4*

85 parts of phenylpyridyl amine were dissolved in 900 parts of benzene. Thereupon a solution of 54 parts of sulfur dichloride in 150 parts of benzene were slowly dropped in with ice cooling of the reaction mixture. A greenish yellow precipitate was produced. After all of the sulfur dichloride had been added, the reaction mixture was heated for two hours at 60° C. and then refluxed for a further hour. At about 80° C., HCl escaped from the reaction vessel. After removal of the reflux condenser, the benzene was distilled off and the residue distilled under vacuum. The resultant product was then treated as in Example 2 to recover the thiophyenylpyridyl amine. Similar results were obtained when the sulfur dichloride was replaced by $S_2Cl_2$.

*Example 5*

15 parts of 3-chlorophenyl amino pyridine were heated with 4.7 parts of sulfur and 0.1 part of iodine. The evolution of hydrogen sulfide began at 240° C. and after such evolution had ceased the reaction product was distilled under vacuum. The oily distillate was dissolved in alcohol and recrystallized therefrom. After two recrystallizations, the 7-chloro-thiophenylpyridyl amine produced had a melting point of 166° C.

*Example 6*

92 parts of 4-methylphenyl amino pyridine were heated with 32 parts of sulfur and 0.6 part of iodine. After the evolution of hydrogen sulfide ceased, the reaction product was distilled under vacuum. The distillate was then dissolved in alcohol and 6-methylthiophenylpyridyl amine recrystallized therefrom as a lemon yellow substance with a melting point of 140–142° C.

*Example 7*

40 parts of thiophenylpyridyl amine, such as produced by the methods indicated in Examples 1–4, were dissolved in 200 parts of water free toluene. After the addition of 16 parts of soda amide, the mixture was refluxed for 1½ hours. Thereafter, 28 parts of dimethylaminoethyl chloride in 30 parts of water free toluene were dropped in and the temperature maintained at 20 to 25° C. for 30 minutes. Thereafter, the mixture was heated at 60° C. for 30 minutes and subsequently refluxed for 20 minutes. Water and hydrochloride acid were then added to the reaction mixture and this mixture rendered alkaline with NaOH and then the alkalized mixture shaken out with ether. The dimethylaminoethyl-N9-thiophenylpyridyl amine base thus obtained was vacuum distilled. It was then converted to its hydrochloride salts. The dihydrochloride salt is lemon yellow in color and melts at 177° C. The monohydrochloride salt is weakly yellow in color and melts at 195–198° C. The yield was almost 100% of the theoretical.

In an analogous manner, dimethylaminoisopropyl-N9-thiophenylpyridyl amine was prepared using dimethylaminoisopropyl chloride as the starting material. The monohydrochloride is an almost white substance with a melting point of 213–216° C. The 8-chlorothiophyllinate salt thereof decomposes slowly upon heating over 150° C. and melts at about 200° C. (melting point not sharp).

Using diethylaminoethyl chloride as a starting material the diethylaminoethyl-N9-thiophenylpyridyl amine was prepared in an analogous manner. The monohydrochloride thereof melts at 182–184° C.

Using 1-dimethylamino-2-methyl-propyl chloride as a starting material, the 1-dimethylamino-2-methylpropyl-N9-thiophenylpyridyl amine was prepared in an analogous manner. The monohydrochloride is a powder with a slight yellow cast and has a melting point of 230–232° C.

The diisopropylaminoethyl-N9-thiophenylpyridyl amine was prepared in an analogous manner, using diisopropylaminoethyl chloride as a starting material. The monohydrochloride thereof was in the form of weakly yellow crystals with a melting point of 223–227° C.

The di-n-butylaminoethyl-N9-thiophenylpyridyl amine was prepared in an analogous manner, using di-n-butylaminoethyl chloride as a starting material. The monohydrochloride thereof was in the form of weakly yellow crystals with a melting point of 184–185° C.

The diethylaminoisopropyl - N9 - thiophenylpyridyl amine was prepared in an analogous manner, using diethylaminoisopropyl chloride was the starting material. The monohydrochloride thereof was in the form of pale yellow crystals with a melting point of 213–215° C.

The dimethylamino-n-propyl - N9 - thiophenylpyridyl amine was prepared in an analogous manner, using dimethylamino-n-propyl chloride as the starting material. The monohydrochloride thereof was in the form of pale yellow crystals having a melting point of 105–108° C.

The diethylamino-n-propyl-N9-thiophenylpyridyl amine was prepared in an analogous manner, using diethylamino-n-propyl chloride as the starting material. The monohydrochloride thereof was in the form of weakly yellowish crystals having a melting point of 142–144° C.

The N9-methyl thiophenylpyridyl amine was prepared in an analogous manner employing methyl iodide as the starting material. The free amine was in the form of white crystals having a melting point of 85–86° C.

The N9-acetyl thiophenylpyridyl amine was prepared in an analogous manner using acetyl chloride as the starting material. It was in the form of yellow needles having a melting point of 166–168° C.

Thiophenylpyridyl amino-N9-acetic acid ethyl ester was prepared in an analogous manner, employing chloro acetic acid ethyl ester as the starting material. It was in the form of pale green crystals having a melting point of 97–98° C.

Example 8

20 parts of thiophenylpyridyl amine were dissolved in 100 parts of absolute toluene. Thereupon, 8 parts of powdered soda amide were added and the mixture refluxed for two hours. After cooling, 27 parts of 1-chloride dissolved in 15 parts of absolute toluene were dropped in with stirring. The reaction being at 60° C. and after the mixture was refluxed for 1 hour water was added and the toluene solution separated therefrom and washed again with water and dried. Toluene was then distilled off from the dried solution and the residue distilled under oil pump vacuum at a pressure of 2–3 mm. The distillate was then shaken out with ethanol, and the N–9 benzyl thiophenylpyridyl amine was crystallized from the ethanol in the form of weakly yellowish needles which melt at 81° C.

Example 9

28 parts of thiophenylpyridyl amine were dissolved in 150 parts of absolute toluene. Thereupon, 8 parts of powdered soda amide were added and the mixture refluxed for two hours. After cooling, 27 parts of 1-methylpiperidyl-4-bromide in 10 parts of absolute toluene were dropped in and thereupon the mixture was refluxed for 5 hours. After cooling, water was added to the reaction mixture and the toluene layer separated off and the residue driven off. The residue was distilled under vacuum. The N9-1-methylpiperidyl-4-thiophenylpyridyl amine base distilled over at a pressure of 3 mm. Hg at temperatures between 190–210° C. The resulting oil was dissolved in ether and the corresponding dihydrochloride precipitated therefrom by addition of HCl in ether. The salt obtained is lemon yellow and hygroscopic.

In an analogous manner, 1-methylpiperidino-4-methylene-N9-thiophenylpyridyl amine was prepared, using 1-methylpiperidyl-4-methyl chloride as a starting material. The boiling point of the weakly yellow oily base at 3 mm. Hg is 204–206° C. The melting point of its dipicrate salt is 187° C.

Example 10

40 parts of thiophenylpyridyl amine were dissolved in 200 parts of absolute toluene. Thereupon, 16 parts of soda amide were added and the mixture refluxed for 1½ hours. Thereafter, 33 parts of morpholino-N-ethyl chloride dissolved in 45 parts of toluene were dropped in and this reaction mixture worked up in the manner described in Example 7. The yield of morpholino-N-ethyl-N9-thiophenylpyridyl amine was almost quantitative. The monohydrochloride is a weakly yellow substance which melts at 217–219° C.

Pyrrolidino-N-ethyl-N9-thiophenylpyridyl amine was produced in an analogous manner, using pyrrolidino-N-ethyl chloride as the starting material. Its monohydrochloride melts at 190–195° C. and is in the form of pale yellow crystals.

Pyrrolidino-N-n-propyl-N9-thiophenylpyridyl amine was prepared in an analogous manner, using pyrrolidino-N-n-propyl chloride as the starting material. Its monohydrochloride melts at 177–181° C. and is in the form of yellowish needles.

Piperidino - N - ethyl - N9 - thiophenylpyridyl amine was prepared in an analogous manner, using piperidino-N-ethyl chloride as the starting material. Its monohydrochloride melts at 229–231° C. and is in the form of crystals having a pale yellow cast.

Piperidino - N - n - propyl - N9 - thiophenylpyridyl amine was prepared in an analogous manner, using piperidine-N-n-propyl chloride as the starting material. Its monohydrochloride melts at 178–180° C. and is in the form of weakly yellow crystals.

Example 11

2.5 parts of dimethylaminoethyl-N9-thiophenylpyridyl amine were dissolved in 30 parts of absolute benzene. Thereafter, 1.3 parts of methyl iodide in 10 parts of absolute benzene were slowly added. After 1 hour, the precipiate produced was filtered off and recrystallized from ethanol. The thiophenylpyridyl amino ethyl-trimethyl ammonium iodide produced is recovered in the form of needles having a weak yellowish cast. Upon heating, this substance turns yellow at 170° C., and foams up at 197° C. and the resulting solid mass melts between 240 and 243° C.

In an analogous manner, thiophenylpyridyl amino isopropyl methyl-diethyl ammonium methyl sulfate was produced from diethyl amino isopropyl-N9-thiophenylpyridyl amine and dimethyl sulfate. This quaternary salt was recovered in the form of pale yellow crystals which decomposed at 164–166° C.

In an analogous manner, thiophenylpyridyl amino isopropyl trimethyl ammonium methyl sulfate was produced from dimethyl sulfate and dimethyl amino isopropyl-N9-thiophenylpyridyl amine. This quaternary salt was recovered in the form of white crystals which decomposed at 84° C.

The antihistaminic activity of N-dimethyl aminoisopropyl thiophenylpyridyl amine on the guinea pigs' isolated ileum is about 2.4 times stronger than the activity of the known N-dimethyl amino-isopropyl phenothiazine.

In protecting against histamine induced asthma of the guinea pig about 220 μg. of N-dimethyl aminoisopropyl thiophenylpyridylamine per kg. are necessary to protect 50% of the thus treated animals. A quantity of about 260 μg. of N-dimethyl aminoisopropyl-phenothiazine per kg., is, however, necessary to produce the same degree of protection.

Seven out of eight patients suffering from heavy attacks of hay fever with strong conjunctivitis could be kept free of any symptoms with a dosage of 4 mg. up to 8 mg. of N-dimethyl aminoisopropyl thiophenylpyridylamine per patient and a period of 24 hours. The secretion was remarkably decreased by the drug without causing the development of an undesired desiccation.

N-piperidino ethyl thiophenylpyridylamine has a remarkably stronger central sedative activity compared with the activity of the known phenothiazine derivative N - dimethylamino-n - propyl chlorophenothiazine. In order to obtain a 30% inhibition of spontaneous motility of mice (recorded in the selenium cell apparatus) a dosage of about 1.5 mg. of N-piperidino ethyl thiophenylpyridylamine (intraperitoneal injection) per kg. body weight is necessary, whilst an amount of about 4.6 mg. of the known derivative N - dimethylamino - n - propyl chlorophenothiazine is necessary to obtain the same effect; consequently, the new compound according to our invention, N-piperidino ethyl thiophenylpyridylamine, is three times as active as the aforementioned known compounds; with respect to the 50% inhibition of spontaneous motility the activity of the new compound is about 2.3 times higher than the activity of the known compound, i.e. N-dimethylamino-n - propyl - chlorophenothiazine.

Also in view to the narcosis (Evipan, trade name), i.e. hexobarbital potentiating activity the new compound N - piperidino - ethylthiophenylpyridylamine is distinctly better than the aforementioned known compound N-dimethylamino-n-propylchlorophenothiazine.

We claim:
1. A thiophenylpyridyl amine compound of the general formula

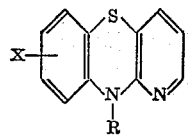

wherein X is selected from the group consisting of hydrogen and chlorine, R is selected from the group consisting of

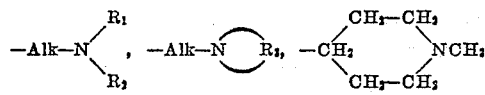

and

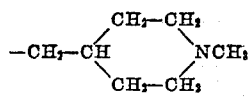

in which Alk is lower alkylene, $R_1$ and $R_2$ are lower alkyl radicals and

is selected from the group consisting of piperidino, pyrrolidino and morpholino radicals.

2. A thiophenylpyridyl amine of the general formula

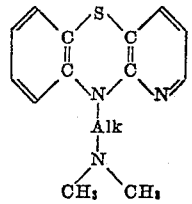

in which Alk is an alkylene radical containing 2 to 3 carbon atoms.

3. A thiophenylpyridyl amine of the general formula

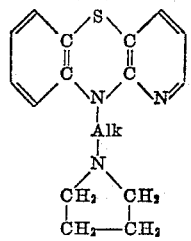

in which Alk is an alkylene radical containing 2 to 3 carbon atoms.

4. A process for the production of a thiophenylpyridyl amine of the general formula

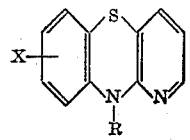

wherein X is selected from the group consisting of hydrogen and chlorine, R is selected from the group consisting of

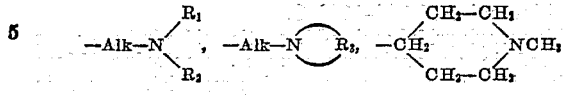

and

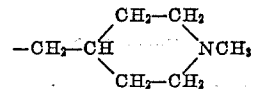

in which Alk is lower alkylene, $R_1$ and $R_2$ are lower alkyl radicals and

is selected from the group consisting of piperidino, pyrrolidino and morpholino radicals which comprises heating to reaction temperature a solution of a compound of the formula

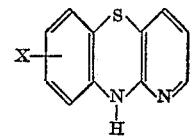

in an inert solvent in contact with a compound of the formula R—Hal in which X and R have the same significance as above and Hal is a halogen atom.

5. The process according to claim 4 in which said reaction is carried out in the presence of an alkaline condensing agent.

6. 10-(dilower alkylaminolower alkyl)-1-azaphenothiazine of the formula

References Cited in the file of this patent

UNITED STATES PATENTS

| | | |
|---|---|---|
| 2,675,380 | Fielden et al. | Apr. 13, 1954 |
| 2,943,086 | Yale et al. | June 28, 1960 |

FOREIGN PATENTS

| | | |
|---|---|---|
| 541,596 | Belgium | Mar. 26, 1956 |
| 549,055 | Belgium | Dec. 27, 1956 |
| 91,901 | Norway | Apr. 26, 1958 |

OTHER REFERENCES

Schlichtegroll Arzneimittel Forsch., vol. 7, pages 237–252 (1957).